US010921757B2

(12) United States Patent
Nagano

(10) Patent No.: US 10,921,757 B2
(45) Date of Patent: Feb. 16, 2021

(54) OPERATION CONTROL DEVICE, OPERATION CONTROL METHOD, AND STORAGE MEDIUM

(71) Applicant: NEC Corporation, Tokyo (JP)

(72) Inventor: Hiroaki Nagano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 83 days.

(21) Appl. No.: 15/759,895

(22) PCT Filed: Sep. 15, 2016

(86) PCT No.: PCT/JP2016/004213
§ 371 (c)(1),
(2) Date: Mar. 14, 2018

(87) PCT Pub. No.: WO2017/047085
PCT Pub. Date: Mar. 23, 2017

(65) Prior Publication Data
US 2018/0239314 A1     Aug. 23, 2018

(30) Foreign Application Priority Data

Sep. 16, 2015 (JP) .............................. JP2015-182691

(51) Int. Cl.
*G05B 13/00* (2006.01)
*G05B 13/04* (2006.01)
(Continued)

(52) U.S. Cl.
CPC .......... *G05B 13/041* (2013.01); *G06F 9/445* (2013.01); *G06K 9/00288* (2013.01); *G06F 21/62* (2013.01)

(58) Field of Classification Search
None
See application file for complete search history.

(56) References Cited

U.S. PATENT DOCUMENTS 9,286,482 B1* 3/2016 Dumont .................. G06F 21/32
2008/0250245 A1* 10/2008 Sanderson .............. H04L 9/321
713/169

(Continued)

FOREIGN PATENT DOCUMENTS

EP     1343121 A2     9/2003
JP     2539378 B2    10/1996
(Continued)

OTHER PUBLICATIONS

International Search Report for PCT Application No. PCT/JP2016/004213, dated Dec. 13, 2016.
(Continued)

*Primary Examiner* — Paul B Yanchus, III

(57) ABSTRACT

An operation control device for controlling operation of an operation device with respect to an operation object includes: operation logic unit that stores in advance an operation logic related to sensor information; virtual object setting unit that sets an operation object to be estimated based on sensor information, as a virtual operation object having an attribute related to presence probability and an operation-related attribute; virtual object operation determination unit that determines whether it is possible to perform an operation with respect to the virtual operation object, based on the attribute related to a presence probability and the operation-related attribute; and operation control unit that controls an operation of the operation device with respect to the operation object by using an operation logic stored in the operation logic means, based on sensor information output from the sensor and a determination result by the virtual object operation determination unit.

15 Claims, 5 Drawing Sheets

(51) Int. Cl.
G06F 9/445 (2018.01)
G06K 9/00 (2006.01)
G06F 21/62 (2013.01)

(56) References Cited

U.S. PATENT DOCUMENTS

2008/0312834 A1  12/2008  Noda et al.
2015/0106739 A1   4/2015  Tan et al.
2016/0125879 A1*  5/2016  Lovitt .................... G10L 17/10
                                                    704/275

FOREIGN PATENT DOCUMENTS

| JP | 3727680    B2 | 12/2005 |
| JP | 2008-307999 A | 12/2008 |
| JP | 2010-034957 A |  2/2010 |
| JP | 2011-146049 A |  7/2011 |
| JP | 2012-163495 A |  8/2012 |

OTHER PUBLICATIONS

English translation of Written opinion for PCT Application No. PCT/JP2016/004213.
Extended European Search Report for EP Application No. EP16845959.2 dated Apr. 12, 2019.

* cited by examiner

Fig. 3

| OPERATION CONTENT | ALLOWABLE PRESENCE PROBABILITY | RANGE OF AUTHORIZATION FOR OPERATION |
|---|---|---|
| DISPLAY WARNING | 60% | SYSTEM MANAGEMENT |
| DISPLAY MESSAGE | 20% | NORMAL |
| PHYSICAL BLOCKING | 90% | SYSTEM MANAGEMENT |
| ALARM | 80% | SYSTEM MANAGEMENT |
| REMOTE REPORT | 70% | NORMAL |

OPERATION CONTROL DEVICE, OPERATION CONTROL METHOD, AND STORAGE MEDIUM

This application is a National Stage Entry of PCT/JP2016/004213 filed on Sep. 15, 2016, which claims priority from Japanese Patent Application 2015-182691 filed on Sep. 16, 2015, the contents of all of which are incorporated herein by reference, in their entirety.

TECHNICAL FIELD

The present invention relates to an operation control device and an operation control method for controlling an operation with respect to an operation object, and a program for implementing the device and method.

BACKGROUND ART

Conventionally, when a certain operation is performed with respect to a measurement object by a sensor, based on sensor information and the like to be output from the sensor, generally, an operation is performed based on a premise that the object is certainly present. Therefore, it is not doubted that presence of the object is uncertain, when an operation is performed with respect to the object.

Further, when a same object is measured by a plurality of sensors, for example, in a case of a system for measuring a pulse, a body temperature, and the other things of a human body by the plurality of sensors, and collecting such pieces of data, it is general to employ a configuration in which measurement data of a same person are aggregated in a smart device such as a smartphone. Thus, it is made certain that data acquired by the plurality of sensors are data collected by measuring the same person. Therefore, generally, a system, in which there is a doubt about whether or not measurement data acquired by the plurality of sensors are derived from the same person, is also not present.

However, by advancement of a sensor technology and a data processing technology in recent years, it becomes possible to perform a certain operation with respect to an object, presence of which is estimated by sensor information output from a plurality of sensors that are not managed by a same controller. For example, when an appropriate display is performed on a signage device for performing advertisement display and another display, based on video data to be acquired by a camera and a signal to be output from a smart device of a person, it is possible to estimate that the person being a target is a member, or the person is present in an effective area of the advertisement display. However, it is not possible to determine whether or not the target is certainly present.

Further, for trespassing of an outsider into a specific area is restricted, a system which may perform control accompanying danger depending on a situation, such as a physical trespass inhibiting means, is considered. The system is controlled when it is estimated that an unauthorized person or the like exists around the specific area, using a human sensor, an image sensor, or the other sensors. In the present circumstances, determination as to whether or not such control is allowed to be performed based on what extent of certainty is secured, depends on individual systems. In particular, since special consideration is required in system designing in order to handle uncertainty, system designing is extremely difficult, as compared with a simple logic, used in a normal system, that an operation (result) is performed based on sensor information (cause).

Techniques for performing control by using ambiguous estimation, so-called fuzzy logic, based on information acquired from a sensor, are disclosed in PTLs 1 and 2, for example. Configurations disclosed in these literatures are a control method for allowing ambiguity of sensor information, and ambiguity of contribution of sensor information to control with respect to a final control object.

CITATION LIST

Patent Literature

[PTL 1] Japanese Patent No. 2539378
[PTL 2] Japanese Patent No. 3727680
[PTL 3] Japanese Laid-open Patent Publication No. 2010-034957

SUMMARY OF INVENTION

Technical Problem

However, in the configurations disclosed in PTLs 1 and 2, it is necessary to perform system designing based on a control method for allowing ambiguity as described above from the beginning. It does not mean that an object which is determined to be certainly present and an object which is determined not to be certainly present, from sensor information, are easily handled by similar processing.

Thus, in a conventional art, a general-purpose means for performing control with respect to an object, presence of which is uncertain, in a simplified manner in a similar way to an object, presence of which is certain, is not established.

As described above, a logic describing sensor information acquired from a sensor, and an operation with respect to the sensor information is fundamentally extremely simple. However, whether or not an actual object is in a situation where such an operation is allowed depends on an individual object. For example, a determination criterion as to whether it is appropriate to display specific information depends on what position a display device is installed in. Further, whether or not an operation which may physically affect the real world is allowed to be performed, depends on a range and an effect which an operation object may affect.

Conventionally, it is general to employ a configuration, in which such determination is incorporated in a control logic of a system individually. However, when a system in which processing is integrated in a cloud architecture and the like, and a wide variety of operations are performed with respect to a wide variety of objects is considered, it is not realistic in terms of system designing to incorporate a logic discriminating an object and determining whether or not it is possible to perform an operation, into an operation logic itself. Specifically, there is a desire for a system configuration capable of determining whether or not it is possible to perform an operation depending on an attribute of an operation object, while keeping simplicity of an operation logic.

An object of the present invention is to implement, in an operation control device for performing an operation with respect to an operation object, based on sensor information, determination as to whether or not it may be possible to perform an operation with respect to an operation object with a simplified configuration, even when presence of the operation object is uncertain.

Solution to Problem

To achieve the above object, an aspect of an operation control device of the present invention for controlling an operation of an operation device with respect to an operation object. The operation control device includes:

operation logic unit that stores in advance an operation logic related to sensor information to be acquired from a sensor;

virtual object setting unit that sets an operation object to be estimated based on sensor information output from the sensor, as a virtual operation object having an attribute related to a presence probability and an operation-related attribute;

virtual object operation determination unit that determines whether or not it is possible to perform an operation with respect to the virtual operation object, based on the attribute related to a presence probability and the operation-related attribute; and operation control unit that controls an operation of the operation device with respect to the operation object by using an operation logic stored in the operation logic unit, based on sensor information output from the sensor and a determination result by the virtual object operation determination unit.

To achieve the above object, an aspect of an operation control method of the present invention controlling an operation of an operation device with respect to an operation object. The operation control method includes:

storing in advance an operation logic related to sensor information to be acquired from a sensor into operation logic unit;

setting an operation object to be estimated based on the sensor information, as a virtual operation object having an attribute related to a presence probability and an operation-related attribute;

determining whether or not it is possible to perform an operation with respect to the virtual operation object, based on the attribute related to a presence probability and the operation-related attribute; and controlling an operation of the operation device with respect to the operation object by using an operation logic stored in the operation logic unit, based on the sensor information and a determination result in the virtual object operation determining step.

To achieve the above object, an aspect of a storage medium of the present invention storing a program for carrying out an operation control method of controlling an operation of an operation device with respect to an operation object, the program causing a computer to execute:

an operation logic preparing step of storing in advance an operation logic related to sensor information to be acquired from a sensor into operation logic unit;

a virtual object setting step of setting an operation object to be estimated based on the sensor information, as a virtual operation object having an attribute related to a presence probability and an operation-related attribute;

a virtual object operation determining step of determining whether or not it is possible to perform an operation with respect to the virtual operation object, based on the attribute related to a presence probability and the operation-related attribute; and an operation controlling step of controlling an operation of the operation device with respect to the operation object by using an operation logic stored in the operation logic unit, based on sensor information output from the sensor and a determination result in the virtual object operation determining step.

Advantageous Effects of Invention

As described above, according to an operation control device in an aspect of the present invention, it is possible to implement determination as to whether or not it may be possible to perform an operation with respect to an operation object with a simplified configuration, even when presence of the operation object is uncertain.

BRIEF DESCRIPTION OF DRAWINGS

FIG. 3 is a diagram illustrating an example of operation-related attributes to be set by a virtual object generation unit of the operation control device.

DESCRIPTION OF EMBODIMENTS

In the following, an operation control device, an operation control method, and a program according to an example embodiment of the present invention are described with reference to FIGS. 1 to 4.

Figure 1:
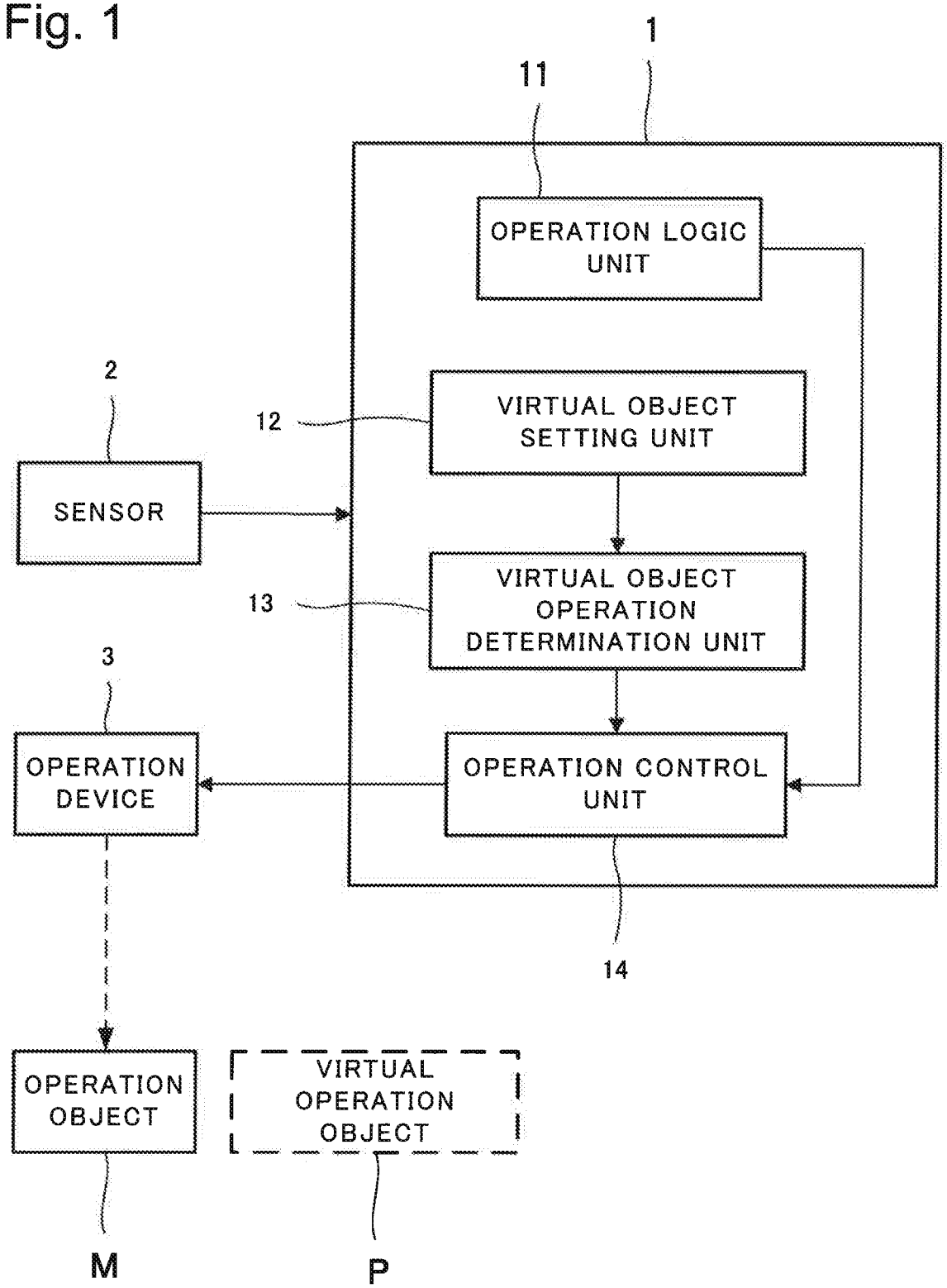
FIG. 1 is a diagram illustrating a schematic configuration of an operation control device.

FIG. 1 is a diagram illustrating a schematic configuration of an operation control device 1 according to the example embodiment of the present invention. The operation control device 1 is a system capable of performing control on an operation with respect to an operation object M by determining whether or not it is possible to perform an operation depending on an attribute of the operation object M, even when the operation object M is uncertain.

The operation control device 1 receives sensor information to be output from a sensor 2, and estimates the operation object M based on the sensor information. Further, in the operation control device 1, in order to set the operation object M, the presence of which is uncertain, as an object, the operation object M, the presence of which is uncertain, is set as a virtual operation object P including attributes related to presence probability and operation-related attributes as described above. The operation control device 1 controls an operation with respect to the operation object M, based on sensor information and attributes of the set virtual operation object P. The attributes of the virtual operation object P include attributes related to presence probability and operation-related attributes of an operation object.

The attributes related to presence probability include information relating to accuracy as to whether or not the virtual operation object P is present, and the like. The operation-related attributes include an operation content, which is estimated to be an operation with respect to the virtual operation object P, and information relating to presence probability of the virtual operation object P when the operation content is allowed, authorization for allowing an operation, and the like.

The operation control device 1 determines whether or not it is possible to perform an operation with respect to the virtual operation object P, based on attributes related to presence probability and operation-related attributes as described above, and performs control on an operation with respect to the operation object M, based on the determination result and sensor information. Further, the operation control device 1 performs an operation with respect to the operation object M by using an operation logic related to sensor information.

Specifically, the operation control device 1 includes an operation logic unit 11, a virtual object setting unit 12, a virtual object operation determination unit 13, and an operation control unit 14. The operation logic unit 11 stores an operation logic related to sensor information to be acquired from the sensor 2. The operation logic is a logic for causing an operation device 3 to perform an operation with respect to the operation object M.

The virtual object setting unit 12 estimates the operation object M based on sensor information to be acquired from the sensor 2, and sets the estimated operation object M, as the virtual operation object P having attributes related to presence probability and operation-related attributes. Specifically, in the virtual object setting unit 12, the operation object M, the presence of which is uncertain, is assumed as the virtual operation object P having a predetermined attribute. Thus, it is possible to perform an operation also with respect to the operation object M, the presence of which is uncertain, by same control as for an actually present operation object.

The virtual object operation determination unit 13 determines whether or not it is possible to perform an operation with respect to a virtual operation object, based on attributes related to presence probability of the operation object M and operation-related attributes with respect to the operation object M set by the virtual object setting unit 12. Specifically, the virtual object operation determination unit 13 extracts an operation content indicating that an operation is allowed with respect to the virtual operation object P by referring to operation-related attributes and attributes related to presence probability.

The operation control unit 14 controls an operation of the operation device 3 with respect to the operation object M by using an operation logic stored in the operation logic unit 11, based on sensor information output from the sensor 2, and a determination result by the virtual object operation determination unit 13.

By the aforementioned configuration, it is possible to control an operation with respect to an operation object M depending on an attribute of the operation object M in the same manner as for an operation object, the presence of which is certain, even when the operation object is the operation object M, the presence of which is uncertain, and for which an allowable operation changes depending on a situation.

Further, it is possible to control an operation with respect to the operation object M, the presence of which is uncertain by providing the virtual object setting unit 12 for setting the virtual operation object P, and the virtual object operation determination unit 13 for determining whether or not it is possible to perform an operation with respect to the virtual operation object P in a configuration of an operation control device substantially equivalent to a conventional operation control device. Thus, by providing the virtual object setting unit 12 and the virtual object operation determination unit 13 in an operation control device for performing control on an operation with respect to an actually present operation object, it becomes possible to also perform control on an operation with respect to the operation object M, the presence of which is uncertain, without modifying a configuration of the operation logic unit 11 and the like. Specifically, since uncertainty of presence of the operation object M does not affect an operation logic, a complex improvement on the operation logic is not necessary.

Figure 2:
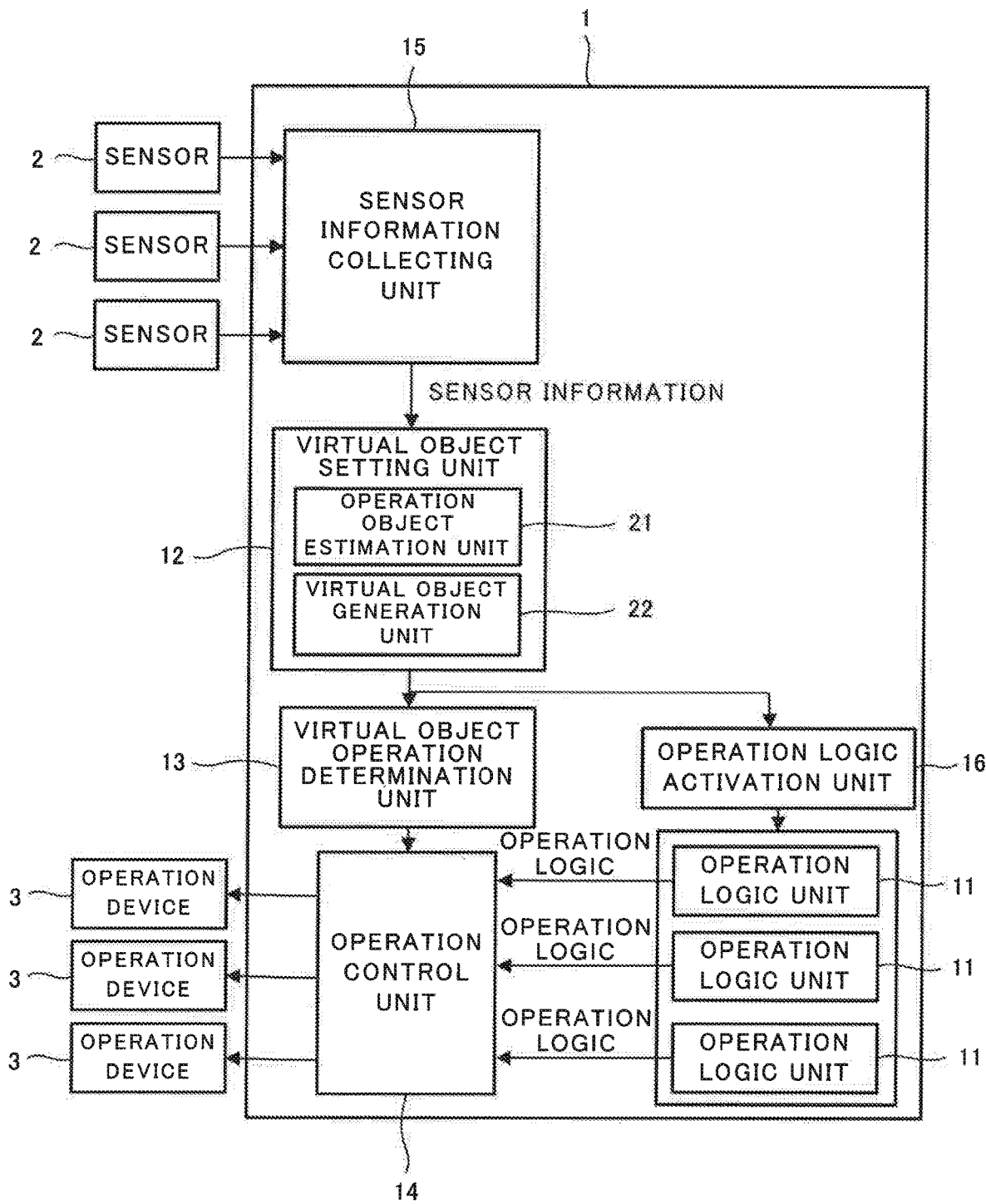
FIG. 2 is a block diagram illustrating a detailed configuration of the operation control device.

Next, a more specific configuration of the operation control device 1 is described in detail by using FIG. 2. FIG. 2 is a block diagram illustrating a detailed configuration of the operation control device 1 according to the example embodiment of the present invention.

The operation control device 1 is constituted by a computer device and the like capable of controlling a plurality of operation devices 3 (operation device group) capable of receiving sensor information to be output from a plurality of sensors 2, and performing an operation with respect to an operation object M. The operation control device 1 includes an operation logic unit 11, a virtual object setting unit 12, a virtual object operation determination unit 13, an operation control unit 14, a sensor information collecting unit 15, and an operation logic activation unit 16.

The sensor information collecting unit 15 collects sensor information to be output from the plurality of sensors 2 (sensor group). Specifically, sensor information to be output from each sensor 2 is input to the sensor information collecting unit 15 in a state that each piece of the sensor information is associated with each sensor 2. The sensor information collecting unit 15 outputs the collected sensor information to the virtual object setting unit 12.

A plurality of the operation logic units 11 are provided in the operation control device 1. The operation logic units 11 store in advance operation logics related to sensor information to be output from the plurality of sensors 2, respectively. Specifically, each operation logic unit 11 stores in advance an operation logic for controlling the operation device 3 which performs an operation with respect to the operation object M in relation to sensor information to be output from each sensor 2. When being activated by the operation logic activation unit 16 to be described later, the operation logic unit 11 outputs an operation logic related to sensor information from among stored operation logics to the operation control unit 14 to be described later.

Note that the operation logic unit 11 may have authorization for operating the operation device 2 according to an operation content, authorization of a person who incorporates an operation logic, and the like.

The virtual object setting unit 12 estimates the operation object M from sensor information output from the sensor information collecting unit 15, and sets the virtual operation object P having a predetermined attribute depending on the estimated operation object M. Specifically, the virtual object setting unit 12 includes an operation object estimation unit 21 and a virtual object generation unit 22.

The operation object estimation unit 21 estimates the operation object M, based on sensor information output from the sensor information collecting unit 15. For example, the operation object estimation unit 21 estimates a person or the like as the operation object M from image information, an action history, position information, and the like as sensor information.

The virtual object generation unit 22 sets the virtual operation object P having attributes related to presence probability and operation-related attributes depending on the operation object M estimated by the operation object estimation unit 21. Further, the virtual object generation unit 22 associates sensor information as a ground for presence probability of the virtual operation object P with the virtual operation object P. The virtual object generation unit 22 sets presence probability depending on accuracy of presence of the operation object M from precision, certainty, the number of pieces of information of sensor information to be acquired from each sensor 2.

For example, when it is possible to substantially identify a person by high-precision face recognition or the like, presence probability of the virtual operation object P is set to 90%, and when a person is estimated based on position information in the past or the like, presence probability of the virtual operation object P is set to 30%. Note that calculation of a value of presence probability may be performed by a method in which a maximum value of accuracy to be acquired from sensor information of each sensor 2 is set to be a value of presence probability, and a method for summing contributions of the respective sensors 2 to accuracy by fuzzy computation or the like.

The virtual object generation unit 22 sets an attribute of an operation with respect to the virtual operation object P. The attribute of an operation is set by estimating an operation device that performs an operation with respect to the virtual operation object P.

For example, an image display device present near a position where the operation object M is estimated, an alarm device by light or sound, a device which physically affects an operation object, a device which is estimated to be owned by the operation object M, and the like are operation devices which are estimated to perform an operation with respect to the virtual operation object P.

The attribute of an operation with respect to the virtual operation object P includes an operation content which is estimated to be an operation with respect to the virtual operation object P, presence probability of the virtual operation object P when the operation is allowed, and authorization for allowing an operation content. An operation content which is estimated to be performed by an operation device, when the operation device is estimated as described above, is set as the operation content to be estimated. FIG. 3 illustrates an example of the operation content to be estimated.

Presence probability (hereinafter, referred to as allowable presence probability) of the virtual operation object P when an operation is allowed is set low when an operation is inadvertently performed or when there is no influence even when the operation object M is not actually present, as exemplified by simple indication or an advertisement image. On the other hand, allowable presence probability is set high with respect to an operation which may greatly affect the operation object M and its periphery, as exemplified by physical shielding with respect to the operation object M or a publicly recognized alarm. FIG. 3 illustrates an example of the allowable presence probability with respect to an example of the operation content to be estimated.

The authorization for allowing an operation content is authorization necessary when the operation logic unit 11 performs an operation logic and causes the operation device 3 to perform an operation. The authorization for allowing an operation content is set for each operation content of an operation device estimated as described above. FIG. 3 illustrates an example of a range of authorization with respect to an example of the operation content to be estimated.

The virtual object operation determination unit 13 determines whether or not it is possible to perform an operation with respect to the virtual operation object P, based on attributes related to presence probability and operation-related attributes set by the virtual object generation unit 22. Specifically, the virtual object operation determination unit 13 determines whether or not presence probability of the virtual operation object P is equal to or larger than the allowable presence probability by comparting the presence probability of the virtual operation object P to be acquired from attributes related to presence probability, with the allowable presence probability included in operation-related attributes.

The virtual object operation determination unit 13 outputs an allowance signal indicating allowance of the operation to the operation control unit 14, when the presence probability of the virtual operation object P is equal to or larger than the allowable presence probability. On the other hand, when the presence probability of the virtual operation object P is lower than the allowable presence probability, the virtual object operation determination unit 13 does not allow the operation. Therefore, the virtual object operation determination unit 13 does not output an allowance signal. Note that the virtual object operation determination unit 13 may not output any signal when an operation is allowed, and may output a disallowance signal to the operation control unit 14 when an operation is not allowed. Further, the virtual object operation determination unit 13 may output an allowance signal when an operation is allowed, and may output a disallowance signal when an operation is not allowed.

As described above, allowable presence probability is set high with respect to an operation which may greatly affect the operation object M and its periphery. Therefore, even when presence probability of the operation object M is relatively high, as far as presence probability of the operation object M is lower than the allowable presence probability by determination of the virtual object operation determination unit 13, the operation which may greatly affect the operation object M and its periphery is not performed. On the other hand, allowable presence probability is set low with respect to an operation having a small influence on the operation object M and its periphery. Therefore, even when presence probability of the operation object M is relatively low, as far as the presence probability is equal to or larger than the allowable presence probability by determination of the virtual object operation determination unit 13, an operation with respect to the operation object M is performed.

The operation logic activation unit 16 selects and activates the operation logic unit 11 having an activation condition related to sensor information from among the plurality of operation logic units 11, after the virtual operation object P is set by the virtual object setting unit 12. By activating the operation logic unit 11, it becomes possible to perform an operation logic stored in the operation logic unit 11.

Note that there is a case that it is not determined whether or not an operation logic associated with an operation content with respect to the virtual operation object P is stored in the operation logic unit 11 among attributes related to an operation of the virtual operation object P set by the virtual object setting unit 12. In this case, the operation logic activation unit 16 may be configured to activate the operation logic unit 11, after determining whether or not the operation logic is included in operation logics stored in the operation logic unit 11.

The operation control unit 14 performs control on an operation of the operation device 3 by using an operation logic stored in the operation logic unit 11 activated by the operation logic activation unit 16. Further, the operation control unit 14 performs control on an operation of the operation device 3, based on a determination result of the virtual object operation determination unit 13. Specifically, the operation control unit 14 controls an operation of the operation device 3 by using an operation logic stored in the operation logic unit 11 selected by the operation logic activation unit 16, when an allowance signal is output from the virtual object operation determination unit 13.

Further, the operation control unit 14 performs an operation logic output from the operation logic unit 11 according to authorization for allowing an operation content among attributes related to an operation of the virtual operation object P. Thus, it is possible to control an operation of the operation device 3 according to authorization of an operation content set in the virtual operation object P.

Figure 4:
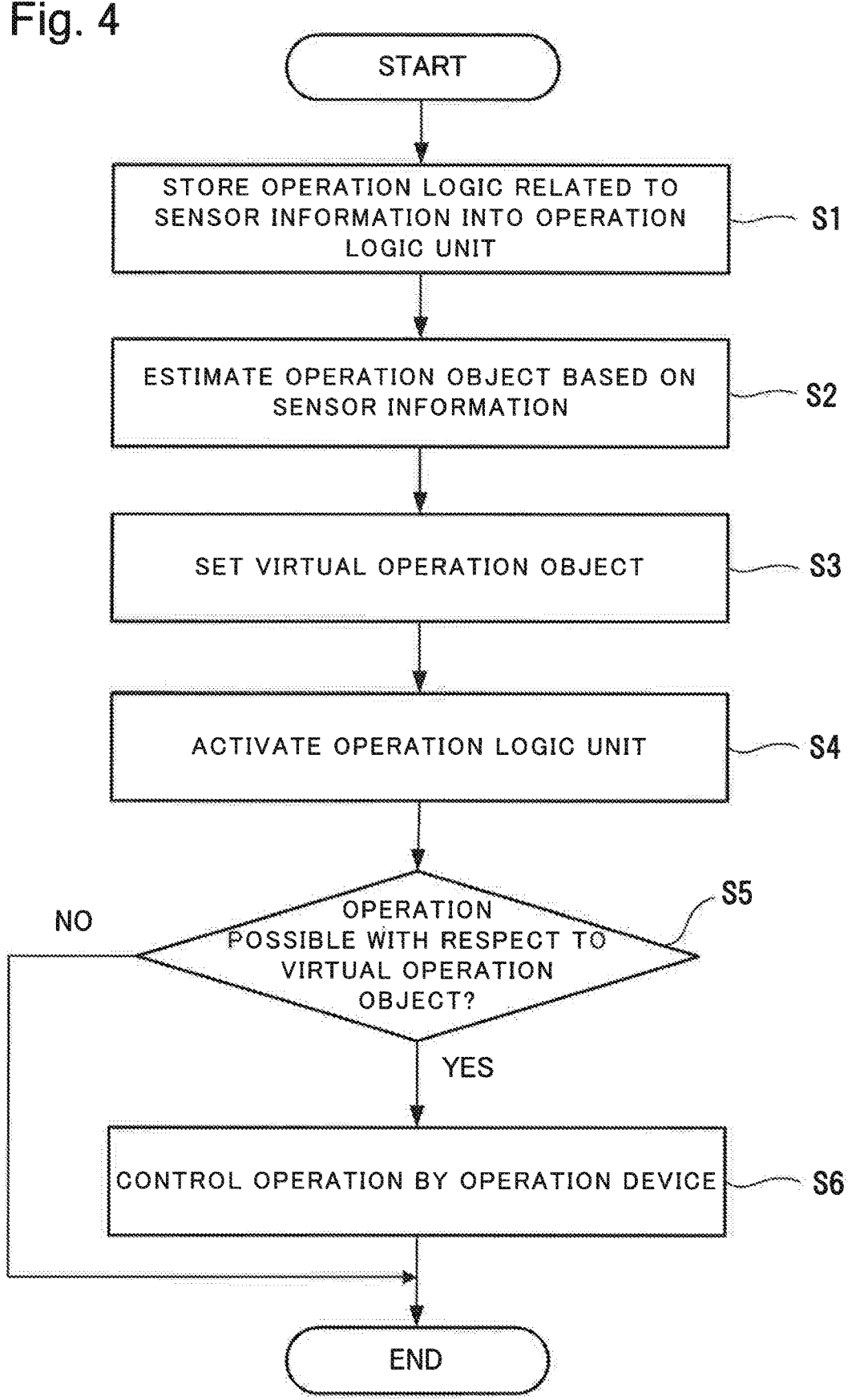
FIG. 4 is a flow illustrating an example of an operation of the operation control device.

Next, an operation of the operation control device 1 according to the example embodiment of the present invention is described using FIG. 4. FIG. 4 is a flowchart illustrating an operation of the operation control device 1. In the following description, FIG. 1 to FIG. 3 are referred to as necessary. Further, in the present example embodiment, an operation control method is implemented by operating the operation control device 1. Therefore, description on the operation control method in the present example embodiment is made by the following description on an operation of the operation control device 1.

When the flow illustrated in FIG. 4 is started (Start), first of all, the operation control device 1 stores an operation logic related to sensor information output from the sensor 2 into the operation logic unit 11 (Step S1). Note that as illustrated in FIG. 2, when a plurality of sensors 2 are present, the operation control device 1 includes a plurality of operation logic units 11, and operation logics related to a plurality of pieces of sensor information are stored in the respective operation logic units 11. An operation logic may be stored in advance in the operation logic unit 11.

Next, the operation control device 1 estimates the operation object M, based on sensor information to be output from the sensor 2 (Step S2). Estimation of the operation object M is performed by the operation object estimation unit 21 of the operation control device 1.

Next, the virtual object generation unit 22 sets the estimated operation object M, as the virtual operation object P having attributes related to presence probability and operation-related attributes (Step S3). Specifically, the virtual operation object P associated with attributes related to presence probability of an operation object and operation-related attributes with respect to the operation object is generated by the virtual object generation unit 22.

The attributes related to presence probability to be set by the virtual object generation unit 22 include accuracy of presence of the operation object M. The accuracy of presence of the operation object M is acquired based on sensor information and the like to be output from the sensor 2. The operation-related attributes are determined by the virtual object generation unit 22, after an operation device which may perform an operation with respect to the virtual operation object P is estimated. The operation-related attributes to be set by the virtual object generation unit 22 include an operation content to be allowed by the operation device, presence probability when an operation is allowed, and authorization for allowing an operation content.

Next, the operation logic activation unit 16 activates the operation logic unit 11 having an activation condition related to sensor information output from the sensor 2 from among the plurality of operation logic units 11 (Step S4). The activated operation logic unit 11 outputs the stored operation logic to the operation control unit 14.

In Step S5 that follows, the virtual object operation determination unit 13 determines whether or not an operation is performed with respect to the virtual operation object P (Step S5). Specifically, the virtual object operation determination unit 13 determines whether or not presence probability of the virtual operation object P is equal to or larger than allowable presence probability of an operation-related attribute among attributes related to presence probability included in the virtual operation object P.

When it is determined by the virtual object operation determination unit 13 that it is possible to perform an operation with respect to the virtual operation object P in Step S5 (in the case of YES), processing is proceeded to Step S6, and an operation of the operation device 3 is controlled by the operation control unit 14. The control of the operation device 3 by the operation control unit 14 is performed based on an operation logic stored in the operation logic unit 11 activated in Step S4. In this case, the operation control unit 14 performs an operation logic output from the operation logic unit 11 according to authorization for allowing an operation content among operation-related attributes of the virtual operation object P. Thus, it is possible to perform an operation with respect to the operation object M by the operation device 3. Thereafter, the flow is finished (End).

On the other hand, when it is determined by the virtual object operation determination unit 13 that it is not possible to perform an operation with respect to the virtual operation object P in Step S5 (in the case of NO), the flow is finished (End).

Herein, Step S1 corresponds to an operation logic preparing step, Step S3 corresponds to an operation object setting step, Step S4 corresponds to an operation logic activating step, Step S5 corresponds to a virtual object operation determining step, and Step S6 corresponds to an operation controlling step, respectively.

According to the present example embodiment as described above, by setting the operation object M, the presence of which is uncertain, as the virtual operation object P having attributes related to presence probability and operation-related attributes, it is possible to determine whether or not it is possible to perform an operation with respect to the virtual operation object P by using these attributes. Thus, it is easy to perform control on an operation with respect to the operation object M, the presence of which is uncertain. Specifically, by setting the virtual operation object P in place of the operation object M, it becomes possible to implement control on an operation with respect to the operation object M, the presence of which is uncertain, by a simplified configuration such that the virtual object setting unit 12 and the virtual object operation determination unit 13 are added to a configuration of a device substantially equivalent to a conventional device.

Further, since it is not necessary to consider uncertainty of an operation object in the operation logic unit 11 and the operation logic activation unit 16, it is not necessary to modify configurations of these units from a conventional configuration. Therefore, since modifying a logic portion is not necessary, it becomes easy to perform system designing.

Further, by providing the plurality of operation logic units 11 in relation to the plurality of sensors 2, it is possible to perform an operation by the plurality of operation devices 3 based on a plurality of pieces of sensor information with respect to the operation object M. Thus, it is possible to perform a variety of operations with respect to the operation object M.

A program in the example embodiment of the present invention may be a program which causes a computer to execute Steps S1 to S6 illustrated in FIG. 4. By installing the program in a computer and causing the computer to execute the program, it becomes possible to implement the operation control device 1 and the operation control method in the present example embodiment. In this case, a central processing unit (CPU) of the computer functions as the operation logic unit 11, the virtual object setting unit 12, the virtual object operation determination unit 13, the operation control unit 14, the sensor information collecting unit 15, and the operation logic activation unit 16, and perform processing.

Further, in the present example embodiment, the operation logic unit 11, the virtual object setting unit 12, the virtual object operation determination unit 13, the operation control unit 14, the sensor information collecting unit 15, and the operation logic activation unit 16 are implemented by storing a data file constituting these units in a storage device such as a hard disk provided in a computer. Alternatively, these units are implemented by installing a recording medium storing the data file in a reading device connected to a computer.

Figure 5:
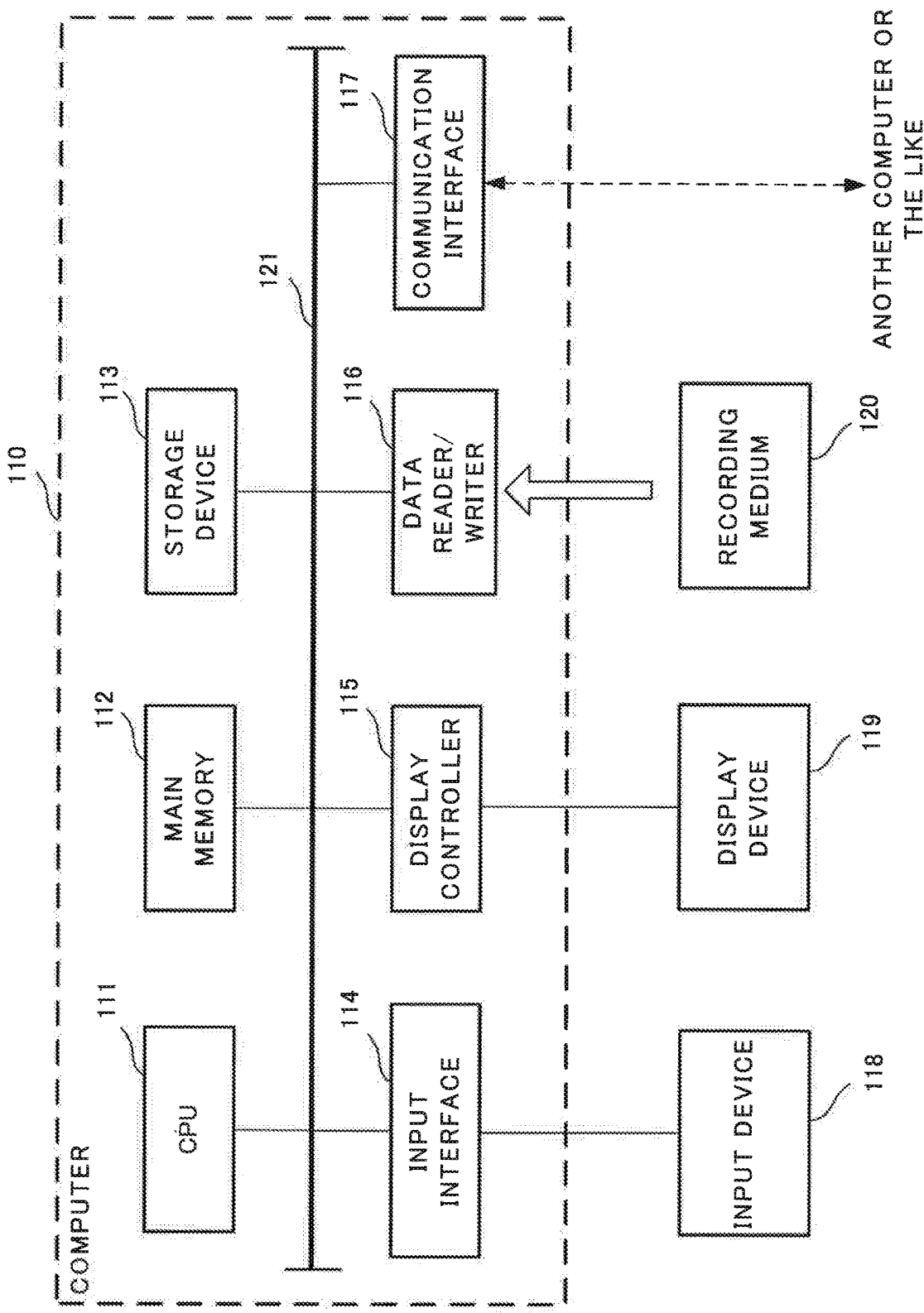
FIG. 5 is a diagram illustrating an example of a configuration of a computer.

Herein, a computer which implements the operation control device 1 by executing a program in the present example embodiment is described by using FIG. 5. FIG. 5 is a block diagram illustrating an example of a computer which implements the operation control device 1 in the example embodiment of the present invention.

As illustrated in FIG. 5, a computer 110 includes a CPU 111, a main memory 112, a storage device 113, an input interface 114, a display controller 115, a data reader/writer 116, and a communication interface 117. These units are connected to be communicable with each other via a bus 121.

The CPU 111 extracts programs (codes) in the present example embodiment, which is stored in the storage device 113, in the main memory 112, and implements various computations by executing the programs in a predetermined order. The main memory 112 is typically a volatile storage device such as a dynamic random access memory (DRAM) or the like. Further, a program in the present example embodiment is provided in a state that the program is stored in a computer-readable recording medium 120. Note that a program in the present example embodiment may be distributed on the Internet connected via the communication interface 117.

Further, as a specific example of the storage device 113, a semiconductor storage device such as a flash memory is exemplified, in addition to a hard disk drive. The input interface 114 mediates data transmission between the CPU 111, and an input device 118 such as a keyboard and a mouse. The display controller 115 is connected to a display device 119, and controls display on the display device 119.

The data reader/writer 116 mediates data transmission between the CPU 111 and the recording medium 120, and executes reading a program from the recording medium 120 and writing a processing result of the computer 110 into the recording medium 120. The communication interface 117 mediates data transmission between the CPU 111 and another computer.

Further, as a specific example of the recording medium 120, there is a general-purpose semiconductor storage device such as a compact flash (CF) (registered trademark) and a secure digital (SD). Further, the recording medium 120 may be a magnetic storage medium such as a flexible disk, or an optical storage medium such as a compact disk read only memory (CD-ROM).

OTHER EXAMPLE EMBODIMENT

In the foregoing, an example embodiment of the present invention is described. The aforementioned example embodiment, however, is merely an example for implementing the present invention. Therefore, the present invention is not limited to the aforementioned example embodiment. It is possible to implement the present invention by modifying the example embodiment as necessary, as far as the modification does not depart from the gist of the present invention.

In the example embodiment, operation-related attributes to be set by the virtual object generation unit 22 include authorization for allowing an operation content. Alternatively, it may be configured such that such an authorization is not included in operation-related attributes, and the operation control device 1 does not consider the authorization.

In the example embodiment, the virtual object setting unit 12 sets the virtual operation object P, based on sensor information to be output from the plurality of sensors 2. Alternatively, when presence probability of the operation object M is high by a part of sensor information (e.g. information from a mobile terminal or the like), and the presence of the operation object M is sufficiently certain, and when another piece of sensor information is uncertain, a plurality of virtual operation objects P having low presence probability set in relation to these pieces of sensor information may be set. In this case, the operation control device 1 may be configured such that an operation of the operation device 3 with respect to the operation object M is allowed, as far as presence probabilities of the plurality of virtual operation objects P are equal to or larger than allowable presence probability.

A part or the entirety of the aforementioned example embodiment may be expressed by the below-described (Supplementary note 1) to (Supplementary note 13), but is not limited by the following description.

(Supplementary Note 1)

An operation control device for controlling an operation of an operation device with respect to an operation object, the operation control device including:

operation logic unit that stores in advance an operation logic related to sensor information to be acquired from a sensor;

virtual object setting unit that sets an operation object to be estimated based on sensor information output from the sensor, as a virtual operation object having an attribute related to a presence probability and an operation-related attribute;

virtual object operation determination unit that determines whether or not it is possible to perform an operation with respect to the virtual operation object, based on the attribute related to a presence probability and the operation-related attribute; and operation control unit that controls an operation of the operation device with respect to the operation object by using an operation logic stored in the operation logic unit, based on sensor information output from the sensor and a determination result by the virtual object operation determination unit.

(Supplementary Note 2)

The operation control device according to Supplementary note 1, wherein the operation control device includes a plurality of the operation logic unit, the plurality of operation logic unit respectively store in advance operation logics related to sensor information to be acquired from a plurality of sensors, and the operation control unit performs an operation with respect to the operation object by the operation device by using an operation logic stored in operation logic unit related to a piece of sensor information output from at least one of the plurality of sensors from among the plurality of operation logic unit, when it is determined that it is possible to perform an operation with respect to the virtual operation object by the virtual object operation determination unit.

(Supplementary Note 3)

The operation control device according to Supplementary note 1 or 2, further including:

operation logic activation unit that selects operation logic unit related to sensor information from among the plurality of operation logic unit, based on the sensor information output from the sensor, and activating the operation logic unit, wherein the operation control unit performs an operation with respect to the operation object by the operation device by using an operation logic stored in operation logic unit activated by the operation logic activation unit, when it is determined that it is possible to perform an operation with respect to the virtual operation object by the virtual object operation determination unit.

(Supplementary Note 4)

The operation control device according to any one of Supplementary notes 1 to 3, wherein the virtual object setting unit sets the presence probability, based on accuracy of sensor information output from the sensor.

(Supplementary Note 5)

The operation control device according to any one of supplementary notes 1 to 4, further including:

a sensor information collecting unit that collects sensor information output from the sensor, wherein the sensor information collecting unit outputs collected sensor information to the virtual object setting unit.

(Supplementary Note 6)

An operation control method of controlling an operation of an operation device with respect to an operation object, the operation control method including:

an operation logic preparation step of storing in advance an operation logic related to sensor information to be acquired from a sensor into operation logic unit;

a virtual object setting step of setting an operation object to be estimated based on the sensor information, as a virtual operation object having an attribute related to a presence probability and an operation-related attribute;

a virtual object operation determination step of determining whether or not it is possible to perform an operation with respect to the virtual operation object, based on the attribute related to a presence probability and the operation-related attribute; and an operation control step of controlling an operation of the operation device with respect to the operation object by using an operation logic stored in the operation logic unit, based on the sensor information and a determination result in the virtual object operation determining step.

(Supplementary Note 7)

The operation control method according to Supplementary note 6, wherein, in the operation logic preparing step, operation logics related to sensor information to be acquired from a plurality of sensors are stored in advance in a plurality of operation logic unit, respectively, and in the operation controlling step, an operation is performed with respect to the operation object by the operation device by using an operation logic stored in operation logic unit related to a piece of sensor information output from at least one of the plurality of sensors from among the plurality of operation logic unit, when it is determined that it is possible to perform an operation with respect to the virtual operation object in the virtual object operation determining step.

(Supplementary Note 8)

The operation control method according to Supplementary note 6 or 7, further including an operation logic activation step of selecting operation logic unit related to sensor information from among the plurality of operation logic unit, based on the sensor information output from the sensor, and activating the operation logic unit, wherein, in the operation control step, when the control is performed, and when it is determined that it is possible to perform an operation with respect to the virtual operation object in the determination, an operation is performed with respect to the operation object by the operation device by using an operation logic stored in operation logic unit activated in the operation logic activating step.

(Supplementary Note 9)

The operation control device according to any one of Supplementary notes 6 to 8, wherein in the virtual object setting step, setting the presence probability, based on accuracy of sensor information output from the sensor.

(Supplementary Note 10)

A program for carrying out an operation control method of controlling an operation of an operation device with respect to an operation object, the program causing a computer to execute:

an operation logic preparing step of storing in advance an operation logic related to sensor information to be acquired from a sensor into operation logic unit;

a virtual object setting step of setting an operation object to be estimated based on the sensor information, as a virtual operation object having an attribute related to a presence probability and an operation-related attribute;

a virtual object operation determining step of determining whether or not it is possible to perform an operation with respect to the virtual operation object, based on the attribute related to a presence probability and the operation-related attribute; and an operation controlling step of controlling an operation of the operation device with respect to the operation object by using an operation logic stored in the operation logic unit, based on sensor information output from the sensor and a determination result in the virtual object operation determining step.

(Supplementary Note 11)

The program according to Supplementary note 10, wherein, in the operation logic preparing step, operation logics related to sensor information to be acquired from a plurality of sensors are stored in advance in a plurality of operation logic unit, respectively, and in the operation controlling step, an operation is performed with respect to the operation object by the operation device by using an operation logic stored in operation logic unit related to a piece of sensor information output from at least one of the plurality of sensors from among the plurality of operation logic unit, when it is determined that it is possible to perform an operation with respect to the virtual operation object in the virtual object operation determining step.

(Supplementary Note 12)

The program according to Supplementary note 10 or 11, further including operation logic activation step of selecting operation logic unit related to sensor information from among the plurality of operation logic unit, based on the sensor information output from the sensor, and activating the operation logic unit, wherein, in the operation control step, when the control is performed, and when it is determined that it is possible to perform an operation with respect to the virtual operation object in the determination, an operation is performed with respect to the operation object by the operation device by using an operation logic stored in operation logic unit activated in the operation logic activating step.

(Supplementary Note 13)

The program according to any one of Supplementary notes 10 to 12, wherein in the virtual object setting step, setting the presence probability, based on accuracy of sensor information output from the sensor.

This application claims the priority based on Japanese Patent Application No. 2015-182691 filed on Sep. 16, 2015, the disclosure of which is incorporated herein in its entirety.

INDUSTRIAL APPLICABILITY

The present invention is applicable to an operation control device for controlling an operation with respect to an operation object, the presence of which is uncertain.

REFERENCE SIGNS LIST

1 Operation control device
2 Sensor
3 Operation device
11 Operation logic unit
12 Virtual object setting unit
13 Virtual object operation determination unit
14 Operation control unit
15 Sensor information collecting unit
16 Operation logic activation unit
21 Operation object estimation unit
22 Virtual object generation unit
M Operation object
P Virtual operation object

What is claimed is:

1. An operation control device for controlling an operation of an operation device with respect to an operation object, the operation control device comprising:
  a memory storing program code; and
  a processor to execute the program code to:
    receive sensor information from a sensor;
    determine a presence probability of an operation object, based on the received sensor information, the presence probability indicating a probability that the operation object is present and presence of the operation object has been detected by the sensor;
    determine an operation-related attribute of the operation object of which the presence probability has been determined;
    determine an operation with respect to a virtual operation object corresponding to the operation object, based on the determined operation-related attribute of the operation object;
    perform the determined operation with respect to the virtual operation object; and
    control an operation of an operation device with respect to the operation object based on predetermined operation logic related to the received sensor information,
  wherein the presence probability is determined in correspondence with an influence on the operation object.

2. The operation control device according to claim 1, wherein
  the memory stores operation logics related to sensor information to be acquired from a plurality of sensors, and
  the processor is to perform an operation with respect to the operation object by using an operation logic related to sensor information output from at least one of the sensors, after having determined that an operation is performable with respect to the virtual operation.

3. The operation control device according to claim 2, wherein the processor is further to:
  select operation logic related to sensor information, based on the sensor information output from the sensor;
  perform an operation with respect to the operation object by using the selected operation logic, after having determining that an operation is performable with respect to the virtual operation object.

4. The operation control device according to claim 2, wherein
  the presence probability is determined based on accuracy of sensor information output from the sensor.

5. The operation control device according to claim 1, wherein the processor is further to:
  select operation logic related to sensor information, based on the sensor information output from the sensor;
  perform the selected operation logic with respect to the operation object, after having determined that an operation is performable with respect to the virtual operation object.

6. The operation control device according to claim 5, wherein
  the presence probability is determined based on accuracy of sensor information output from the sensor.

7. The operation control device according to claim 1, wherein
  the processor determines the presence probability, based on accuracy of sensor information output from the sensor.

8. An operation control method of controlling an operation of an operation device with respect to an operation object, the operation control method comprising:
  receiving sensor information from a sensor;
  determining a presence probability of an operation object, based on the received sensor information, the presence probability indicating a probability that the operation object is present and presence of the operation object has been detected by the sensor;
  determining an operation-related attribute of the operation object of which the presence probability has been determined;
  determining an operation with respect to a virtual operation object corresponding to the operation object, based on the determined operation-related attribute of the operation object;
  performing the determined operation with respect to the virtual operation object; and
  controlling an operation of an operation device with respect to the operation object based on predetermined operation logic related to the received sensor information,
  wherein the presence probability is determined in correspondence with an influence on the operation object.

9. The operation control method according to claim 8, further comprising:

preparing and storing operation logics related to sensor information to be acquired from a plurality of sensors; and performing an operation with respect to the operation object by the operation device by using an operation logic related to sensor information output from at least one of the sensors, after having determining that an operation is performable with respect to the virtual operation object.

10. The operation control method according to claim 9, further comprising:

selecting operation logic related to sensor information, based on the sensor information output from the sensor; and performing an operation with respect to the operation object, after having determined that an operation is performable with respect to the virtual operation object.

11. The operation control method according to claim 8, further comprising:

selecting operation logic related to sensor information, based on the sensor information output from the sensor;

performing the selected operation logic with respect to the operation object, after having determined that an operation is performable with respect to the virtual operation object.

12. A non-transitory computer readable storage medium storing a program for carrying out an operation control method of controlling an operation of an operation device with respect to an operation object, the program causing a computer to execute processing comprising:

receiving sensor information from a sensor;

determining a presence probability of an operation object, based on the received sensor information, the presence probability indicating a probability that the operation object is present and presence of the operation object has been detected by the sensor;

determining an operation-related attribute of the operation object of which the presence probability has been determined;

determining an operation with respect to a virtual operation object corresponding to the operation object, based on the determined operation-related attribute of the operation object;

performing the determined operation with respect to the virtual operation object; and controlling an operation of an operation device with respect to the operation object based on predetermined operation logic related to the received sensor information, wherein the presence probability is determined in correspondence with an influence on the operation object.

13. The storage medium storing the program according to claim 12, wherein the processing further comprises:

preparing and storing operation logics related to sensor information to be acquired from a plurality of sensors; and performing an operation with respect to the operation object by the operation device by using an operation logic related to sensor information output from at least one of the sensors, after having determining that an operation is performable with respect to the virtual operation object.

14. A storage medium storing the program according to claim 13, wherein the processing further comprises selecting operation logic related to sensor information, based on the sensor information output from the sensor; and performing an operation with respect to the operation object, after having determined that an operation is performable with respect to the virtual operation object.

15. The storage medium storing the program according to claim 12, wherein the processing further comprises:

selecting operation logic related to sensor information, based on the sensor information output from the sensor;

performing the selected operation logic with respect to the operation object, after having determined that an operation is performable with respect to the virtual operation object.

* * * * *